United States Patent
Dunn et al.

(10) Patent No.: US 9,835,233 B2
(45) Date of Patent: Dec. 5, 2017

(54) GEARBOX FOR ACTUATING A COMPONENT OF A VEHICLE SEAT

(71) Applicant: Kongsberg Interior Systems II, Inc., Novi, MI (US)

(72) Inventors: Sean Dunn, Taylor, MI (US); Ashley Fritz, Macomb, MI (US); Kelly Harvester, Brighton, MI (US)

(73) Assignee: KONGSBERG INTERIOR SYSTEMS II, INC., Novi, MI (US)

( * ) Notice: Subject to any disclaimer, the term of this patent is extended or adjusted under 35 U.S.C. 154(b) by 79 days.

(21) Appl. No.: 14/997,760

(22) Filed: Jan. 18, 2016

(65) Prior Publication Data

US 2017/0204949 A1    Jul. 20, 2017

(51) Int. Cl.
| | |
|---|---|
| *F16H 19/06* | (2006.01) |
| *B60N 2/30* | (2006.01) |
| *B60N 2/48* | (2006.01) |
| *B60N 2/225* | (2006.01) |
| *B60N 2/005* | (2006.01) |

(52) U.S. Cl.
CPC ....... *F16H 19/0622* (2013.01); *B60N 2/2251* (2013.01); *B60N 2/3011* (2013.01); *B60N 2/4832* (2013.01); *B60N 2/4852* (2013.01); *B60N 2002/0055* (2013.01)

(58) Field of Classification Search
None
See application file for complete search history.

(56) References Cited

U.S. PATENT DOCUMENTS

| | | | |
|---|---|---|---|
| 4,691,584 A | 9/1987 | Takaishi et al. | |
| 6,193,022 B1 | 2/2001 | Bode | |
| 6,364,414 B1* | 4/2002 | Specht | B60N 2/4829 297/216.13 |
| 6,595,894 B2 | 7/2003 | Hanatani | |
| 6,863,162 B1 | 3/2005 | Gabas | |
| 7,597,647 B2 | 10/2009 | Calinescu | |
| 7,802,490 B2 | 9/2010 | Ingraham | |
| 7,845,472 B2 | 12/2010 | Gil et al. | |
| 2003/0200627 A1* | 10/2003 | Becker | B60N 2/20 16/349 |
| 2014/0346832 A1* | 11/2014 | Jung | B60N 2/02 297/362 |

* cited by examiner

*Primary Examiner* — Justin Holmes
*Assistant Examiner* — Timothy Hannon
(74) *Attorney, Agent, or Firm* — Howard & Howard Attorneys PLLC

(57) ABSTRACT

A gearbox for actuating at least one component of a vehicle seat. The gearbox includes a housing. An input pulley and an output pulley are rotatably coupled to the housing. A sun gear is attached to one of the pulleys. A ring gear is coupled to the housing and disposed about the sun gear. A plurality of planetary gears are attached to the other of the pulleys and are operably engaged with the sun gear and the ring gear. An input cable is coupled to the input pulley to rotate the input pulley in a first direction. An output cable is coupled to the output pulley and moves in a first direction in response to rotation of the input pulley. A biasing member is operatively connected to the output pulley to rotate the output pulley in a second direction opposite of the first direction to move the input cable.

23 Claims, 7 Drawing Sheets

GEARBOX FOR ACTUATING A COMPONENT OF A VEHICLE SEAT

BACKGROUND OF THE INVENTION

1. Field of the Invention

The present invention relates, generally, to vehicle seats and, more specifically, to a gearbox for actuating a component of a vehicle seat.

2. Description of the Related Art

Vehicle seats known in the art include a seat bottom and a seat back configured to accommodate, support, and secure an occupant of a vehicle. The seat bottom is operatively attached to the vehicle. The back is pivotally attached to the bottom such that the occupant can selectively fold and unfold the back with respect to the bottom. In addition, the seat can include a headrest pivotally attached to the back such that the headrest is foldable with the back to create a smaller footprint when the seat is in a folded position.

There are a number of different types of mechanisms known in the related art for actuating folding mechanisms in vehicle seats. While seats and adjustment mechanisms known in the prior art have generally performed well for their intended purpose, there remains a need in the art for a gearbox that actuates the mechanisms of the vehicle seat with reduced noise, vibration, and harshness.

SUMMARY OF THE INVENTION AND ADVANTAGES

Provided is a gearbox for actuating at least one component of a vehicle seat. The gearbox includes a housing defining an interior. An input pulley is rotatably coupled to the housing and an output pulley is rotatably coupled to the housing. A sun gear is attached to one of the pulleys. A ring gear is coupled to the housing and disposed about the sun gear. A plurality of planetary gears are attached to the other of the pulleys and are operably engaged with the sun gear and the ring gear. An input cable is coupled to the input pulley. The input cable has a neutral state and an activated state with the input cable rotating the input pulley in a first direction when the input cable moves from the neutral state to the activated state. An output cable is coupled to the output pulley. The output cable has a locked state and an unlocked state with the output cable moving from the locked state to the unlocked state when the output pulley rotates in the first direction in response to the rotation of the input pulley in the first direction. A biasing member is operatively connected to the output pulley to rotate the output pulley in a second direction opposite of the first direction to move the input cable from the activated state to the neutral state.

BRIEF DESCRIPTION OF THE DRAWINGS

Advantages of the present invention will be readily appreciated, as the same becomes better understood by reference to the following detailed description when considered in connection with the accompanying drawings.

DETAILED DESCRIPTION OF THE INVENTION

Figure 1:
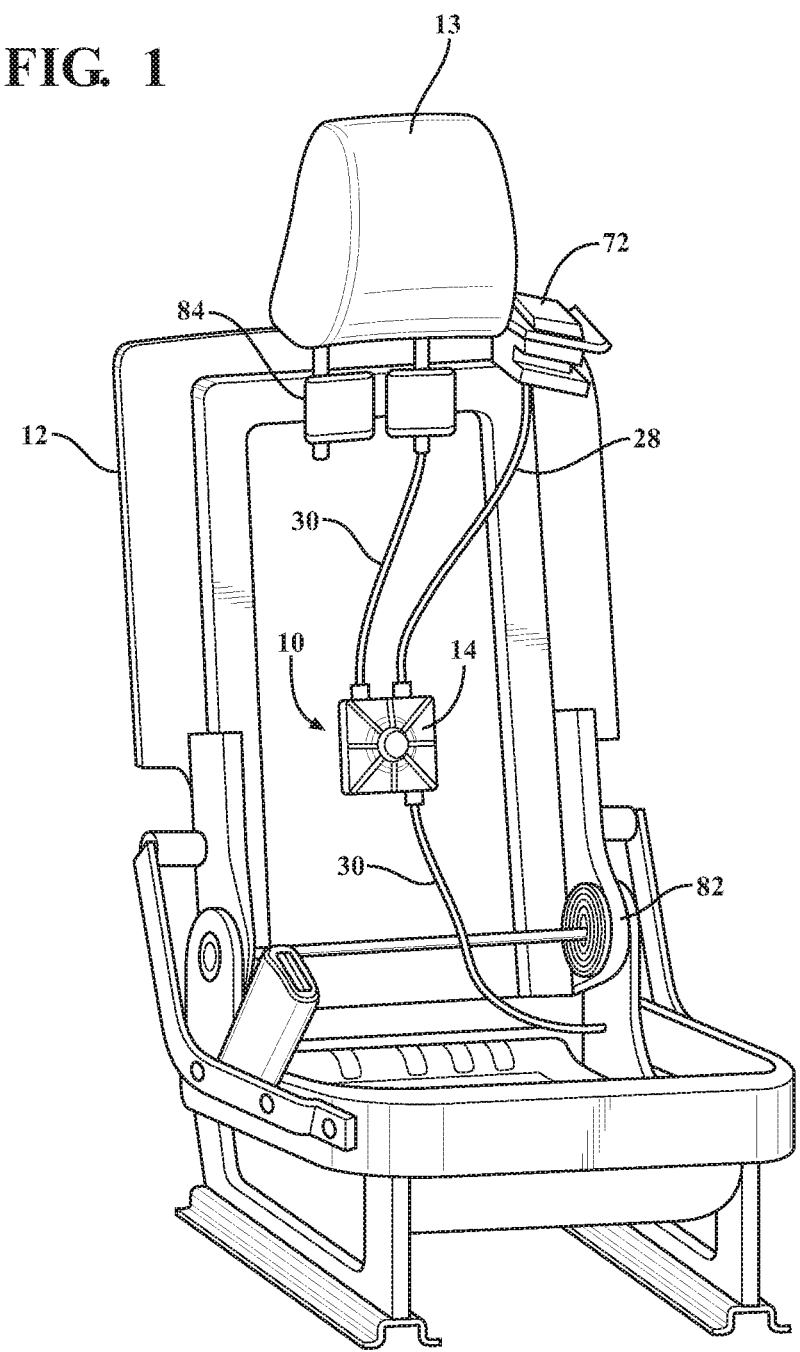
FIG. 1 is an environmental view of a vehicle seat and a gearbox.

With reference to the Figures, wherein like numerals indicate like parts throughout the several views, a gearbox 10 for actuating at least one component of a vehicle seat 12 is generally shown in FIG. 1. As one non-limiting example, the gearbox 10 is installed in a vehicle seat 12 to actuate folding components of the seat 12, such as a headrest 13 and a headrest folding mechanism 84 or a seat back folding mechanism 82.

Referring also to FIGS. 2-5, the gearbox 10 includes a housing 14 defining an interior 16. The housing 14 may further include a main body 15 defining the interior 16 and a cover 40 enclosing the interior 16. The main body 15 partially encloses the interior 16 on five sides in a substantially cubic arrangement. The cover 40 is secured to the main body 15 by several cover clips 42. The cover 40 may be secured to the main body 15 to prevent intrusion of foreign material and protect the cables. It is to be appreciated that the main body 15 and cover 40 may be of any suitable configuration.

The gearbox 10 further includes an input pulley 18 rotatably coupled to the housing 14 and an output pulley 20 rotatably coupled to the housing 14. The housing 14 may also include a protrusion 44 having a lengthwise axis 46. The pulleys 18, 20 may be rotatably coupled to the protrusion 44. The protrusion 44 extends from the interior 16 of the housing 14 to support the input pulley 18 and the output pulley 20. The input pulley 18 and the output pulley 20 may be aligned along the lengthwise axis 46 of the protrusion 44. The input pulley 18 may further define a center bore 51. The center bore 51 may rotatably engage with the protrusion 44. Further, the input pulley 18 may be supported by the center bore 51 on the protrusion 44.

Figure 2:
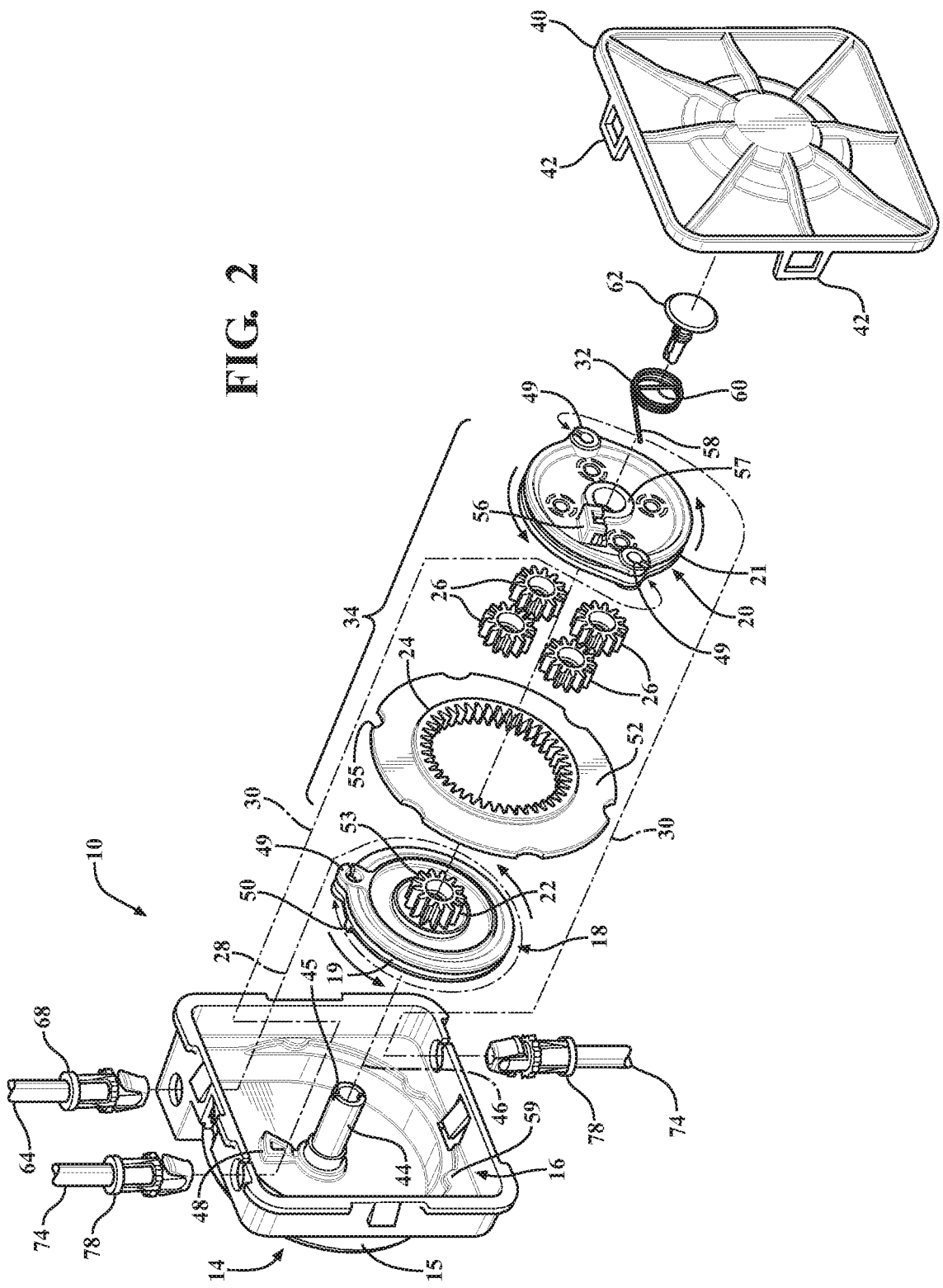
FIG. 2 is an exploded view of the gearbox.
Figure 3:
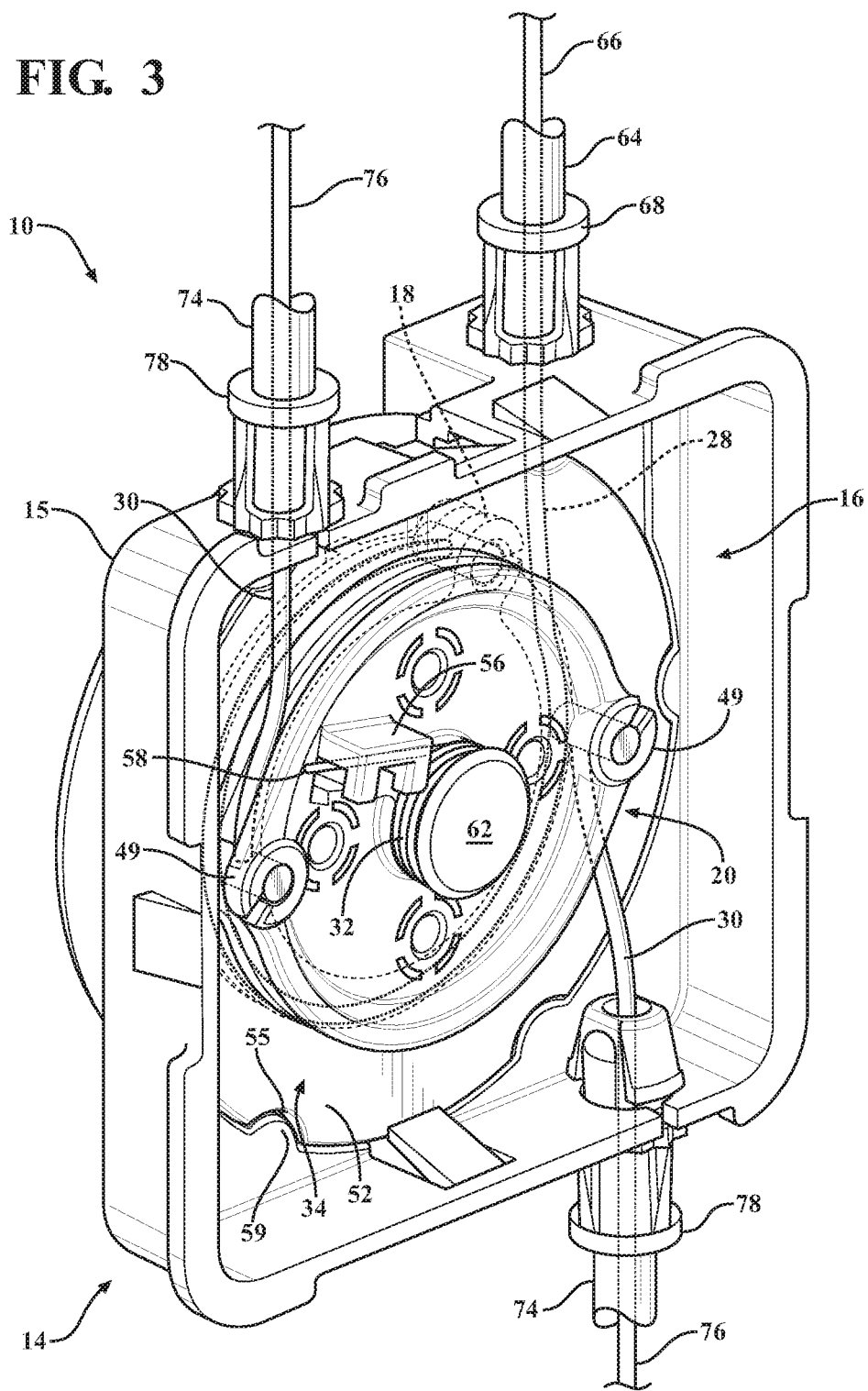
FIG. 3 is a perspective view of the gearbox of FIG. 2 with a cover removed.

The gearbox 10 further includes a sun gear 22 attached to one of the pulleys 18, 20. As shown in FIG. 2, the sun gear 22 may be attached to the input pulley 18. Alternatively, the sun gear 22 may protrude from the input pulley 18. The sun gear 22 may further include a center bore 53. The center bore 53 may rotatably engage with the protrusion 44. The sun gear 22 and the input pulley 18 may be formed as a single piece having the same center bore 53.

Figure 4:
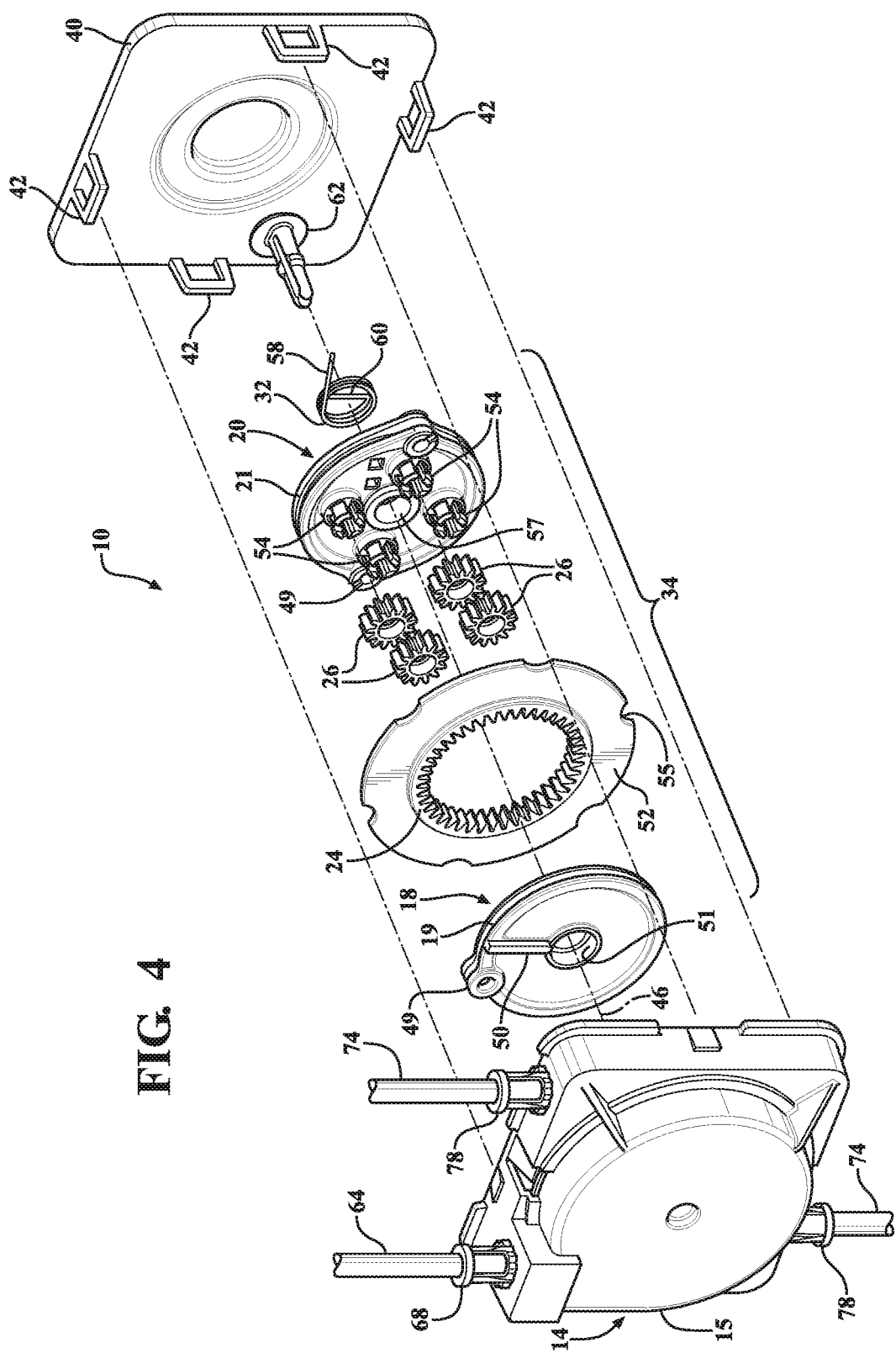
FIG. 4 is another exploded view of the gearbox of FIG. 2.
Figure 5:
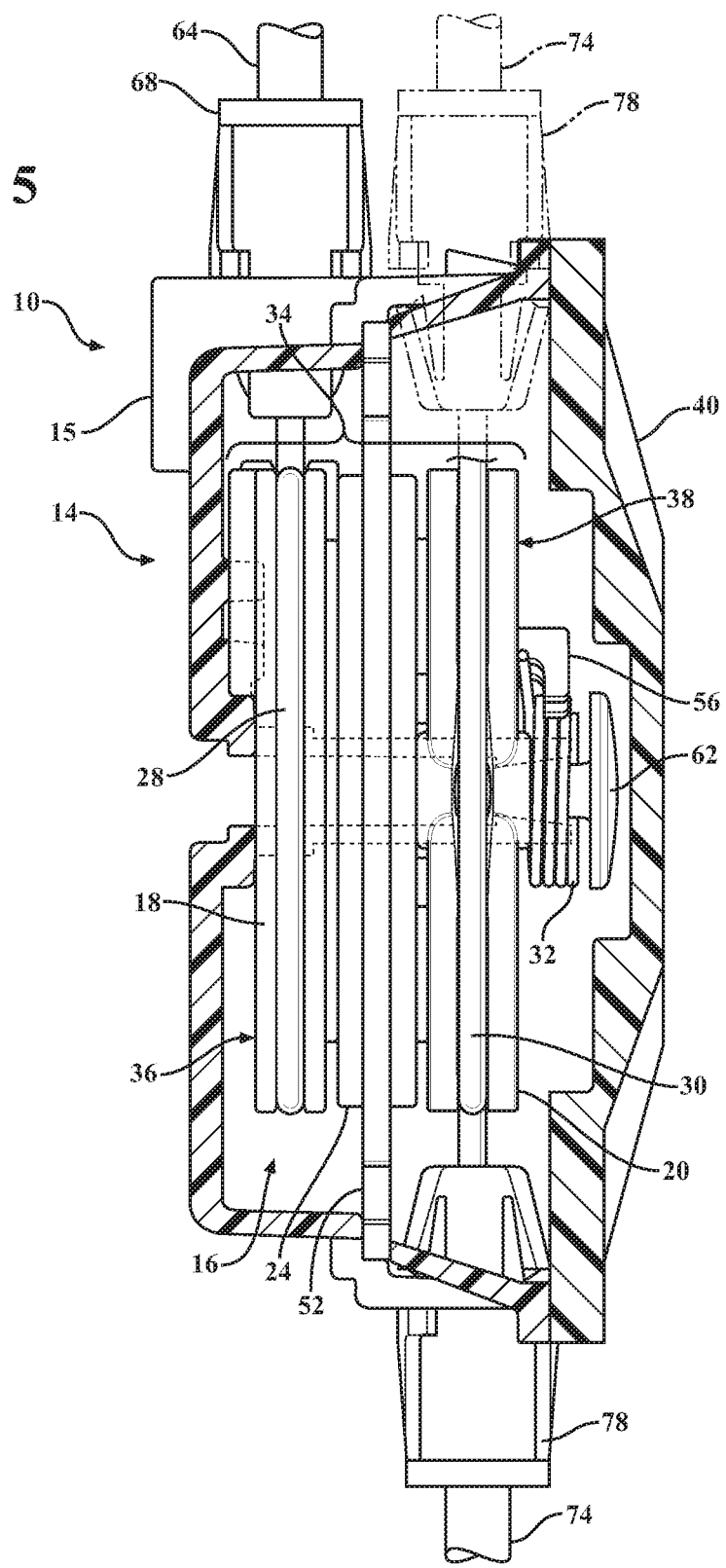
FIG. 5 is a partially cross-sectional view of the gearbox of FIG. 2.
Figure 6:
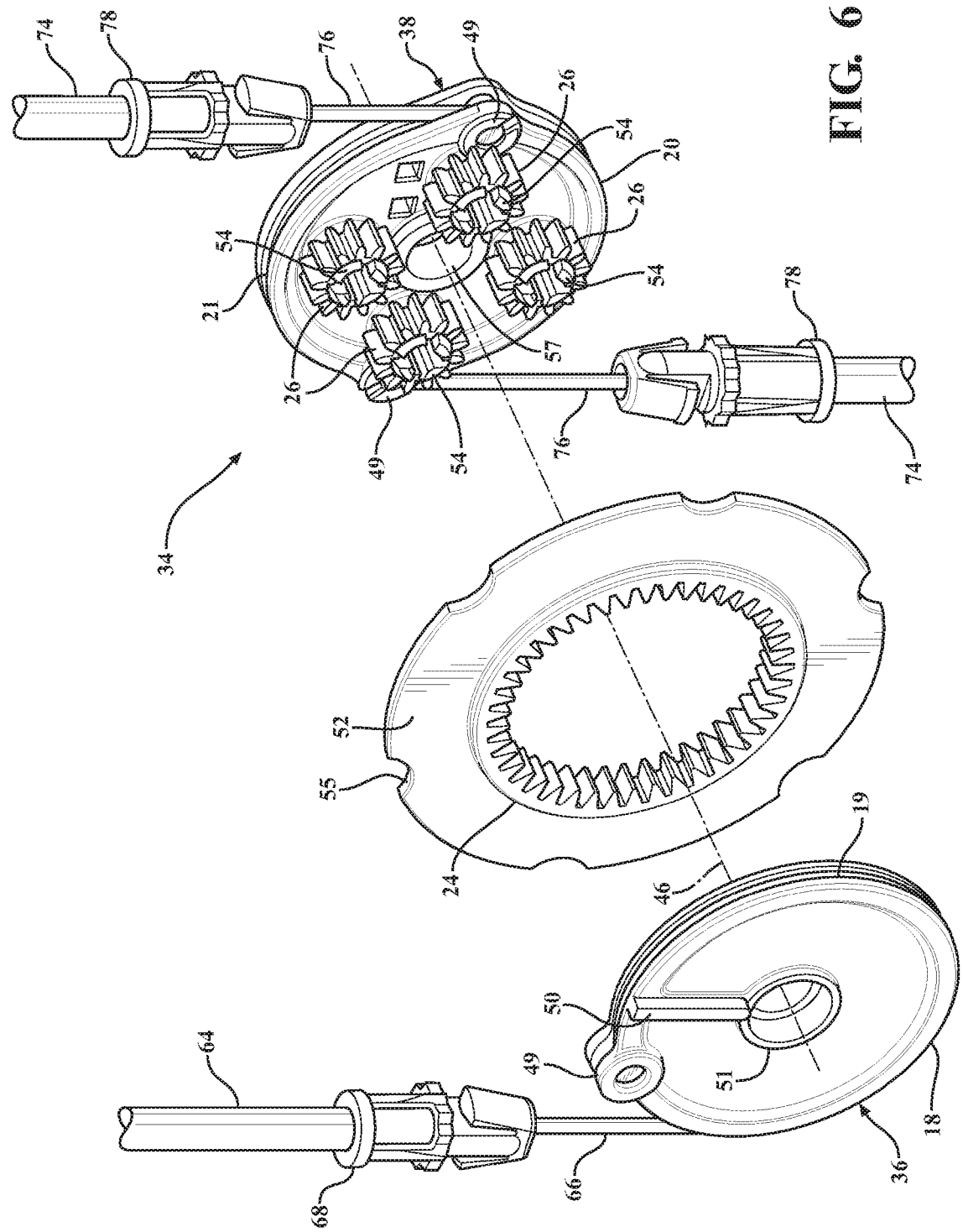
FIG. 6 is an exploded view of certain portions of the gearbox of FIG. 2.

Referring to FIGS. 2, 4, and 6, a ring gear 24 is coupled to the housing 14 and disposed about the sun gear 22. The ring gear 24 is arranged concentrically with the sun gear 22. The ring gear 24 includes an outer surface and an inner surface that define a hole. The inner surface of the ring gear 24 includes a plurality of internal teeth that engage with planetary gears 26 as discussed below.

The ring gear 24 may further include a mounting flange 52 to locate the ring gear 24 within the housing 14 and prevent rotation of the ring gear 24 relative to the housing 14. The mounting flange 52 may be attached to the outer surface of the ring gear 24. The mounting flange 52 engages with the housing 14 to prevent rotation of the ring gear 24 relative to the housing 14. The mounting flange 52 may include alignment features 55 that locate the ring gear 24 within the housing 14. As shown in FIG. 2, the alignment features 55 may include radially spaced scallops which interface with recesses 59 in the housing 14.

A plurality of planetary gears 26 are attached to the other of the pulleys 18, 20 and are operably engaged with the sun gear 22 and the ring gear 24. In one embodiment, the planetary gears 26 may be attached to the output pulley 20. The sun gear 22, ring gear 24, and the planetary gears 26 collectively define a planetary system 34. The planetary system 34 operably couples the input pulley 18 with the output pulley 20 to transfer mechanical energy from an input cable 28 to an output cable 30. As shown in FIG. 4, the planetary system 34 may be arranged between the input pulley 18 and the output pulley 20.

Shown in FIGS. 4 and 6, the input pulley 18 defines a first plane 36 and the output pulley 20 defines a second plane 38. The first plane 36 may be offset from and parallel to the second plane 38. The ring gear 24 may be arranged between the first plane 36 and the second plane 38. Similarly, the planetary system 34 may be arranged between the first plane 36 and the second plane 38.

An input cable 28 is coupled to the input pulley 18. The input cable 28 has a neutral state and an activated state with the input cable 28 rotating the input pulley 18 in a first direction when the input cable 28 moves from the neutral state to the activated state.

The input pulley 18 is shown in FIGS. 2-6 as a circular disk defining a circumferential groove 19. The groove 19 routes the input cable 28 around the input pulley 18 when winding or unwinding between the neutral and the activated positions. The input pulley 18 may also be provided with a cable socket 49 on the groove 19. The cable socket 49 couples a first end of the input cable 28 to the input pulley 18.

As shown in FIG. 6, the input cable 28 is coupled to the input pulley 18. In order to rotate the input pulley 18, the input cable 28 at least partially winds around the input pulley 18.

The input cable 28 as described above, has two states, the neutral state and the activated state. The neutral state is defined by the input cable 28 being wound around the input pulley 18. The activated state is defined by the input cable 28 being at least partially unwound from the input pulley 18. Said differently, the input cable 28 moves between the neutral state and the activated state by unwinding from the input pulley 18. The input cable 28 may unwind from the input pulley 18 when the input cable 28 is tensioned by a handle 72 connected to a second end of the input cable 28.

An output cable 30 is coupled to the output pulley 20. The output cable 30 has a locked state and an unlocked state with the output cable 30 moving from the locked state to the unlocked state when the output pulley 20 rotates in the first direction in response to the rotation of the input pulley 18 in the first direction.

The output pulley 20 is shown in FIGS. 2-6 as a circular disk defining a circumferential groove 21. The groove 21 routes the output cable 30 around the output pulley 20 when winding or unwinding. The output pulley 20 may also be provided with a cable socket 49 on the groove 21. The cable socket 49 couples a first end of the output cable 30 to the output pulley 20.

The output pulley 20 may further define a center bore 57. The center bore 57 may rotatably engage with the protrusion 44. Further, the output pulley 20 may be supported by the center bore 57 on the protrusion 44.

The output pulley 20 may further include a plurality of gear pins 54 extending from the output pulley 20 to support the planetary gears 26. The gear pins 54 extend from the output pulley 20 and are radially arranged around the center bore 57. The planetary gears 26 are rotatably coupled to the gear pins 54.

As shown in FIG. 6, the output cable 30 is coupled to the output pulley 20. The output cable 30 at least partially winds around the output pulley 20. The output cable 30 has two states, the locked state and the unlocked state. The locked state is defined by the output cable 30 being unwound from the output pulley 20. The unlocked state is defined by the output cable 30 being at least partially wound around the output pulley 20 in response to rotation of the output pulley 20. Said differently, the output cable 30 moves from the locked state to the unlocked state by winding around the output pulley 20. The output pulley 20 is rotated in the first direction to wind the output cable 30 around the output pulley 20 and tension the output cable 30.

A biasing member 32 is operatively connected to the output pulley 20 to rotate the output pulley 20 in a second direction opposite of the first direction to move the input cable 28 from the activated state to the neutral state.

The planetary gears 26 rotate the output pulley 20 in the first direction in response to the sun gear 22 being rotated by the input pulley 18 in the first direction. Conversely, the sun gear 22 rotates the input pulley 18 in the second direction in response to the planetary gears 26 being rotated by the output pulley 20 in the second direction.

Referring back to FIG. 2, the housing 14 may further include a radial stop 48. The radial stop 48 may be a lip that radially extends from the protrusion 44 at an end coupled to the housing 14. Shown in FIGS. 4 and 6, the input pulley 18 may include a stop tab 50 that cooperates with the radial stop 48 to limit rotation of the input pulley 18 between the neutral state and the activated state. The radial stop 48 interrupts movement of the stop tab 50 and the input pulley 18 to constrain the input cable 28 between the neutral state and the activated state.

The protrusion 44 has a channel 45 located at a distal end of the protrusion 44. The channel 45 secures a leg of the biasing member 32 to the protrusion 44. The protrusion 44 may be a cylinder which engages with a center bore 51 in the input pulley 18 and the output pulley 20. The gearbox 10 may further include a cap 62 secured to the protrusion 44 to maintain the input pulley 18 and the output pulley 20 on the protrusion 44. The cap 62 constrains the pulleys to the protrusion 44 which improves engagement of the planetary system 34.

The output pulley 20 may further include a spring tab 56 operably engaging the biasing member 32. The spring tab 56 may be substantially hook shaped to retain a first leg 58 of the biasing member 32. The spring tab 56 preferably engages the biasing member 32 to transfer rotational energy back and forth as the input cable 28 moves between the neutral state and the activated state.

The biasing member 32 may be a torsion spring having a first leg 58 and a second leg 60. The first leg 58 may be engaged with the output pulley 20 and the second leg 60 may be engaged with the housing 14. The second leg 60 may be secured to the housing 14 to allow the output pulley 20 to rotate the first leg 58 relative to the second leg 60. Preferably, the output pulley 20 is rotated in the first direction to wind the output cable 30. In the first direction, motion is transferred from the output pulley 20 to the second leg 60 of the biasing member 32.

The input cable 28 may further include a conduit 64 and a core element 66. The conduit 64 includes a first connector 68 at the first end of the input cable 28 secured to the housing 14. The conduit 64 may also include a second connector 70 at a second end of the input cable 28 secured to the handle 72. The conduit 64 may have a generally circular cross section with the core element 66 disposed within the conduit 64. The core element 66 moves freely within the conduit 64 relative to the first and second connectors 68, 70.

The output cable 30 may further include a conduit 74 and a core element 76. The conduit 74 has a first connector 78 at a first end of the output cable 30 that is secured to the housing 14. The conduit 74 may also include a second connector 80 at the second end of the output cable 30 that is secured to the seat component. The conduit 74 may have a generally circular cross section with the core element 76 disposed within the conduit 74. The core element 76 moves freely within the conduit 74 relative to the first and second connectors 78, 80.

Referring to FIG. 1, the input cable 28 may be connected between the handle 72 and the input pulley 18 such that the handle 72 tensions the input cable 28 to unwind from the input pulley 18. The input pulley 18 rotates the sun gear 22 in a first direction when the input cable 28 is unwound. Rotation of the sun gear 22 is transferred to the planetary gears 26. The planetary gears 26 each rotate about a gear pin at the same time as orbiting about the sun gear 22. The orbit of the planetary gears 26 transfers movement to the output pulley 20 through the gear pins 54 causing the output pulley 20 to rotate. The input cable 28 and the output cable 30 are at least partially wound into the interior 16. In one embodiment, the input pulley 18 and the output pulley 20 rotate at a ratio of 4:1; however, other ratios are contemplated. It is to be appreciated that an additional ratio between a diameter of the input pulley 18 and a diameter of the output pulley 20 may be calculated. The ratio of rotation and the ratio of diameters may be multiplied together to express a total ratio. The total ratio may be 3:1, 4:1, 5:1, or other suitable values arising from design requirements.

The input cable 28 returns to the neutral position using the biasing member 32. The handle 72 releases tension from the input cable 28 allowing the biasing member 32 to rotate the output pulley 20 in the second direction. The output pulley 20 in turn induces the planetary gears 26 to orbit about the sun gear 22 and rotate within the ring gear 24. Movement of the planetary gears 26 drives the sun gear 22 and the input pulley 18 in the second direction. The input pulley 18 rotates to tension the input cable 28 toward the neutral position and wind the cable around the input pulley 18. The biasing member 32 maintains tension on the input cable 28.

As illustrated in FIG. 1, the output cable 30 is connected between the output pulley 20 and the component of the vehicle seat 12. The component may be a seatback folding mechanism 82. When the output pulley 20 rotates in the first direction, the output cable 30 may be wound around the output pulley 20 into the interior 16 of the housing 14. The output cable 30 moves from the locked position into the unlocked position to unlock the seat component.

The output cable 30 may be a plurality of output cables each connected to the output pulley 20 to actuate a component of the vehicle seat 12. The output cables may be used to actuate multiple parts of the component, such as a pair of release hooks securing the seat 12 to a vehicle. Alternatively, the output cables may be used to activate multiple components of the vehicle seat 12 such as a seatback folding mechanism 82 and a headrest folding mechanism 84.

Figure 7:
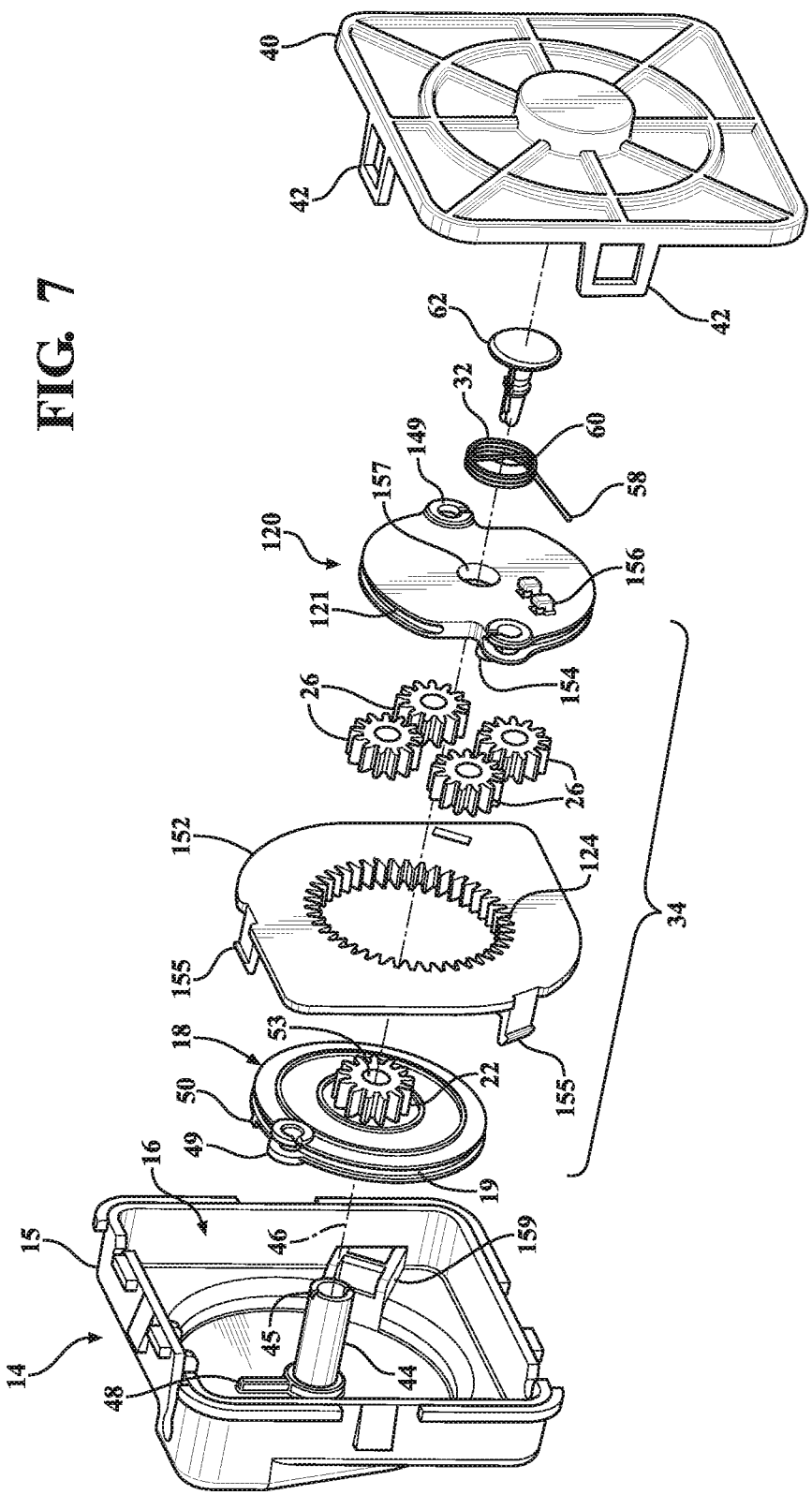
FIG. 7 is an exploded view of another embodiment of the gearbox.

An alternative embodiment of a gearbox 110, where like components are increased by 100, is shown in FIG. 7. The gearbox 110 operates in a similar manner as described above. The primary difference is that a ring gear 124 is a flat plate defining a hole. The hole includes a plurality of internal gear teeth that engage with planetary gears 26. The flat plate is a mounting flange 152 that may include alignment features 155. The alignment features 155 are tabs that engage with complementary recesses 159 to secure the ring gear 124 to a housing 14.

An output pulley 120 is shown in FIG. 7 as a circular disk defining a circumferential groove 121. The groove 121 routes the output cable 30 around the output pulley 120 when winding or unwinding. The output pulley 120 may also be provided with a cable socket 149 on the groove 121. The cable socket 149 couples a first end of the output cable 30 to the output pulley 120.

The output pulley 120 may further include a spring tab 156 operably engaging the biasing member 32. The spring tab 156 may be substantially hook shaped to retain a first leg 58 of the biasing member 32. The spring tab 156 preferably engages the biasing member 32 to transfer rotational energy back and forth as the input cable 28 moves between the neutral state and the activated state.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A gearbox for actuating at least one component of a vehicle seat comprising:
    a housing defining an interior;
    an input pulley rotatably coupled to said housing;
    an output pulley rotatably coupled to said housing;
    a sun gear attached to one of said input pulley and said output pulley;
    a ring gear coupled to said housing and disposed about said sun gear;
    a plurality of planetary gears attached to the other of said input pulley and said output pulley and operably engaged with said sun gear and said ring gear;
    an input cable coupled to said input pulley with said input cable having a neutral state and an activated state with said input cable rotating said input pulley in a first direction when said input cable moves from said neutral state to said activated state;
    an output cable coupled to said output pulley with said output cable having a locked state and an unlocked state with said output cable moving from said locked state to said unlocked state when said output pulley rotates in said first direction in response to said rotation of said input pulley in said first direction; and
    a biasing member operatively connected to said output pulley to rotate said output pulley in a second direction opposite of said first direction to move said input cable from said activated state to said neutral state.

2. The gearbox as set forth in claim 1 wherein said sun gear, said ring gear, and said planetary gears define a planetary system with said planetary system arranged between said input pulley and said output pulley.

3. The gearbox as set forth in claim 1 wherein said sun gear is attached to said input pulley and said planetary gears are attached to said output pulley.

4. The gearbox as set forth in claim 3 wherein said planetary gears rotate said output pulley in said first direction in response to said sun gear being rotated by said input pulley in said first direction.

5. The gearbox as set forth in claim 3 wherein said sun gear rotates said input pulley in said second direction in response to said planetary gears being rotated by said output pulley in said second direction.

6. The gearbox as set forth in claim 1 wherein said input cable at least partially winds around said input pulley, and wherein said output cable at least partially winds around said output pulley.

7. The gearbox as set forth in claim 6 wherein said neutral state is defined by said input cable being wound around said input pulley and said activated state is defined by said input cable being at least partially unwound from said input pulley in response to an external force.

8. The gearbox as set forth in claim 6 wherein said locked state is defined by said output cable being unwound from said output pulley and said unlocked state is defined by said output cable being at least partially wound around said output pulley in response to rotation of said output pulley.

9. The gearbox as set forth in claim 1 wherein said input pulley and said output pulley rotate at a ratio of 4:1.

10. The gearbox as set forth in claim 1 wherein each of said input cable and said output cable include a conduit and a core element, and wherein each of said conduits are attached to said housing and said core element moves freely within said conduit.

11. The gearbox as set forth in claim 1 wherein said output cable is further defined as a plurality of output cables each connected to said output pulley for actuating one or more components of the vehicle seat.

12. The gearbox as set forth in claim 1 wherein said input cable and said output cable are at least partially wound into said interior of said housing.

13. The gearbox as set forth in claim 1 wherein said ring gear includes a mounting flange to locate said ring gear within said housing and prevent rotation of said ring gear relative to said housing.

14. The gearbox as set forth in claim 1 wherein said biasing member is a torsion spring with a first leg engaged with said output pulley and a second leg engaged with said housing.

15. The gearbox as set forth in claim 1 wherein said output pulley is formed with a spring tab operably engaging said biasing member.

16. The gearbox as set forth in claim 1 wherein said housing includes a radial stop and said input pulley includes a stop tab limiting rotation of said input pulley between said neutral state and said activated state.

17. The housing as set forth in claim 1 further including a protrusion having a lengthwise axis extending from said interior of said housing to support said input pulley and said output pulley.

18. The gearbox as set forth in claim 17 wherein said input pulley and said output pulley are aligned along said lengthwise axis of said protrusion.

19. The gearbox as set forth in claim 17 further including a cap secured to said protrusion to maintain said input pulley and said output pulley on said protrusion.

20. The gearbox as set forth in claim 1 wherein said input pulley defines a first plane and said output pulley defines a second plane with said first plane being offset from and parallel to said second plane.

21. The gearbox as set forth in claim 20 wherein said planetary system is arranged between said first plane and said second plane.

22. The gearbox as set forth in claim 20 wherein said ring gear is arranged between said first plane and said second plane.

23. The gearbox as set forth in claim 1 wherein said housing further includes a main body defining said interior and a cover enclosing said interior.

* * * * *